United States Patent [19]

Sigmon

[11] Patent Number: 4,467,701
[45] Date of Patent: Aug. 28, 1984

[54] EXPANSIBLE DEVICE

[75] Inventor: James W. Sigmon, Charlotte, N.C.

[73] Assignee: Sigmon Company, Charlotte, N.C.

[21] Appl. No.: 282,742

[22] Filed: Jul. 13, 1981

Related U.S. Application Data

[63] Continuation of Ser. No. 6,892, Jan. 26, 1979, Pat. No. 4,295,633.

[51] Int. Cl.³ .............................. F16J 3/02; F16J 15/46
[52] U.S. Cl. .................................. 92/103 M; 92/98 R; 92/163; 92/90; 277/34.3
[58] Field of Search .............. 92/89, 96, 98 R, 103 M, 92/163, 50, 69 R, 75, 34, 48, 61, 90, 91, 92, 93, 98 D, 99, 165 R; 251/172, 170, 171, 173; 188/72.4, 366; 192/85 A, 88 A, 85 R; 277/34.3, 73

[56] References Cited

U.S. PATENT DOCUMENTS

| | | | |
|---|---|---|---|
| 2,923,130 | 2/1960 | Wheelon | 92/90 |
| 2,991,763 | 7/1961 | Marette | 92/89 |
| 3,112,095 | 11/1963 | Batzer | 251/172 |
| 3,262,707 | 7/1966 | Williams | 277/34.3 |
| 3,435,936 | 4/1969 | Warman | 192/88 A |
| 3,527,329 | 9/1970 | Jordan | 192/88 A |
| 3,995,723 | 12/1976 | Holcomb, Jr. | 92/103 M |
| 4,026,514 | 5/1977 | Sumner et al. | 251/173 |
| 4,165,880 | 8/1979 | Olsson | 277/34.3 |

FOREIGN PATENT DOCUMENTS

1808970  5/1976  Fed. Rep. of Germany ..... 277/34.3

Primary Examiner—Robert E. Garrett
Assistant Examiner—Richard L. Klein
Attorney, Agent, or Firm—Parkhurst & Oliff

[57] ABSTRACT

An expansible device for exerting force which has a generally "S" shape cross-section, being formed by stepped diameter cylinder, and arrangements using such a device are disclosed. The device may exert sealing forces and be controlled by admission of fluid pressure which acts on a thin wall member so supported as to be subjected to compressive stress alone.

16 Claims, 13 Drawing Figures

EXPANSIBLE DEVICE

This is a continuation of application Ser. No. 6,892 filed Jan. 26, 1979, now U.S. Pat. No. 4,295,633.

FIELD AND BACKGROUND OF INVENTION

It has long been recognized that difficulty has been encountered in developing a uniform force between members which engage about a central axis along which either a fluid flows or some mechanical movement takes place. These difficulties are particularly apparent with seals, but occur with other devices as well. Examples of sealing problems about axes on which fluids flow are found in valve structures of many types. Examples of other force problems in connection with mechanical movement may be found in rotary joints through which fluid flows, in shaft seals for blocking fluid flow, in pressure vessel closures, and in brakes and the like. It has been seen as desirable to have a capability for linear motion over short distances to apply forces at varying and controlled levels. However, accomplishing this capability while accommodating reliability under extremes of environment and operating conditions has not previously been possible.

SUMMARY OF INVENTION

The present invention solves the problems presented in prior arrangements by the provision of an expansible device which can be energized and relaxed as required and which eliminates frictional binding when pressure is removed. The device is capable of functioning as a seal and has a generally "S" shape cross-section, being formed by stepped diameter cylinders. That is, the seal or expansible device of this invention has at least one thin wall member encircling a central axis and having a pair of axially extending cylindrical wall portions lying at differing radii from the axis, joined by an annular portion lying generally on a plane perpendicular to the axis. The thin wall member cooperates with a pressure plate or force transfer member in such a way as to be subjected substantially only to compressive stress and to transfer force to and through the plate, uniformly about a circumference encircling the axis.

The present invention thus comprises at least one thin wall member encircling a central axis and having first and second axially extending cylindrical wall portions respectively spaced at differing first and second radii from the axis, with one axial end of the inner wall portion being joined to an encircling axial end of the outer wall portion by a generally planar annular portion lying generally on a plane perpendicular to the axis, and with the wall portions extending in opposite axial directions from the plane of the annular portion.

In one form, the present invention is a seal comprising a pair of thin wall members encircling a common central axis and each having first and second axially extending cylindrical wall portions respectively spaced at differing first and second radii from the axis, each of the members having one axial end of the inner wall portion joined to an encircling axial end of the corresponding outer wall portion by a generally planar annular portion lying generally on a plane perpendicular to the axis, with the wall portions of respective members extending in opposite axial directions from the plane of the respective annular portion and with the pair of members defining therebetween a volume into which pressurized actuating fluid is introduced for exerting through the seal a controlled force. This type of device is particularly useful where a need for replacement may arise.

In either form stated above, the invention has application to valve structure of varying types including ball valves, plug valves, gate valves and butterfly valves; to rotary and shaft seals; and to mechanical devices such as fluid pressure amplifiers, clutches and brakes.

With the above discussion in mind, it is an object of this invention to accomplish sealing of paths which would otherwise be leakage paths for fluids through the use of a thin wall member of the type described. By realizing this object of the present invention, a wide range of applications for the device of this invention is opened. Further, the exertion of force through limited ranges of movement by and through liquid and/or gas pressure is facilitated in a manner which avoids loss of pressurization by leakage while facilitating adaptation to a range of apparatus of otherwise generally known types.

Yet a further object of this invention is to use the possibilities of plastic or flow deformation of a thin wall member subject only to compressive stress to facilitate exertion of force over limited ranges of movement while maintaining a fluid tight seal. In realizing this object of the present invention, a particular shape or configuration accomplishes limitation of the nature of the stress imposed while accommodating sealing.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, it is to be understood at the outset of the detailed description of this invention that it is contemplated that various modifications of the invention as described may be made by persons skilled in the appropriate arts. For that reason, the detailed description is to be read broadly, and not as limiting on the scope of this invention.

As briefly pointed out above, the device described here is intended to be used in many applications wherein it is desired to develop a linear motion over a selectively short distance while also developing a force which may be high but controllable from a fluid pressure source, to provide minimum return travel upon release of fluid pressure, to provide an annular opening coaxial with the device for the passage of fluids or mechanical elements such as rotating and/or reciprocating shafts, and to function reliably and maintain sealing integrity under extremes of environment and operating conditions not possible with typical piston-cylinder arrangements, bellows or diaphrams.

The device is of generally annular shape and has an "S" shaped or stepped cylindrical cross-section, with inner and outer cylinders and a radial portion generally straight and the junction between the inner cylinder and radial portion, and between the radial portion and outer cylinder, formed as radii as defined hereinafter. There are at least two useful configurations in which the device is made. One form (FIG. 1) involves a single member 20 as described above with the terminal ends of the inner and outer cylinders of the "S" welded to a fixed and non-yielding member 21 to form a pressure chamber 22 between the two, such that pressure applied within the chamber does not move the fixed member, but does produce motion of the "S" member. The second configuration (FIG. 2) consists of two "S" shaped members 30a, 30b of the same radial portion and adjoining radii dimensions, but of differently elongated inner and outer cylinders of the "S" shape, fitted together and welded along the circumferences at each end so as to form a totally enclosed pressure chamber 32, one side of which is fitted with at least one connection 34 to introduce fluid pressure within the enclosure. Where a gas is used as the pressurizing fluid, a single connection will suffice. Where a liquid is used, a second connection may be desirable to function as a return or drain. The connection side is nested into a fixed and non-yielding member 31, contoured to support the entire outer surface of this side of the device and through which fluid connection to the enclosed chamber may be made. Contoured to nest snugly to the outer surface of the second "S" member of this configuration, and also of the outer surface of the single "S" member of the first configuration, and constrained to move only in the direction of the center axis of the assembly, is a movable member or pressure plate 25, 35 to transfer the force developed within the seal by the applied fluid pressure.

For purposes of the following discussion, R1 will designate the inside radius of the inner cylinder portion of the "S"; R2, the radius joining the inner cylinder portion to the radial portion; R3, the radius joining the radial portion to the outer cylinder portion; R4, the radius of the outer cylinder portion; and T, the thickness of the seal material. The radii R1 and R4 of the cylindrical portions are taken from the central axis encircled by the seal, while the radii R2 and R3 of the joining part-toroids are taken from the respective centers of curvature.

Figure 1:
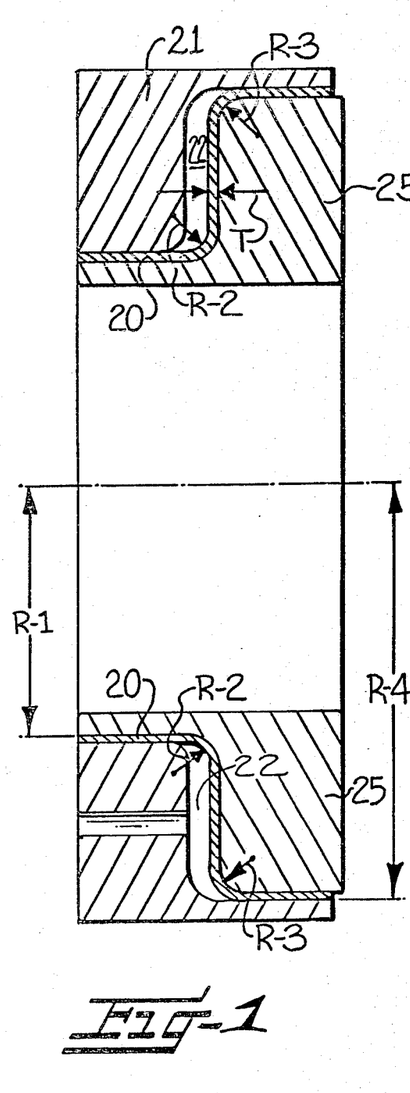
FIG. 1 is a partly schematic sectional view through one form of device in accordance with this invention.
Figure 2:
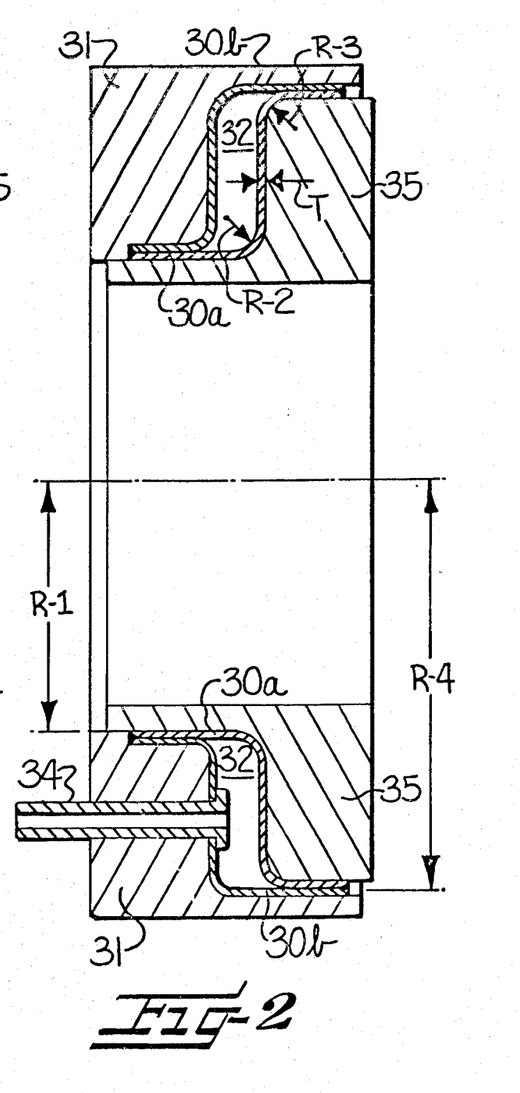
FIG. 2 is a view similar to FIG. 1, through another form of device in accordance with this invention.
Figures 3, 4, 5, 6:
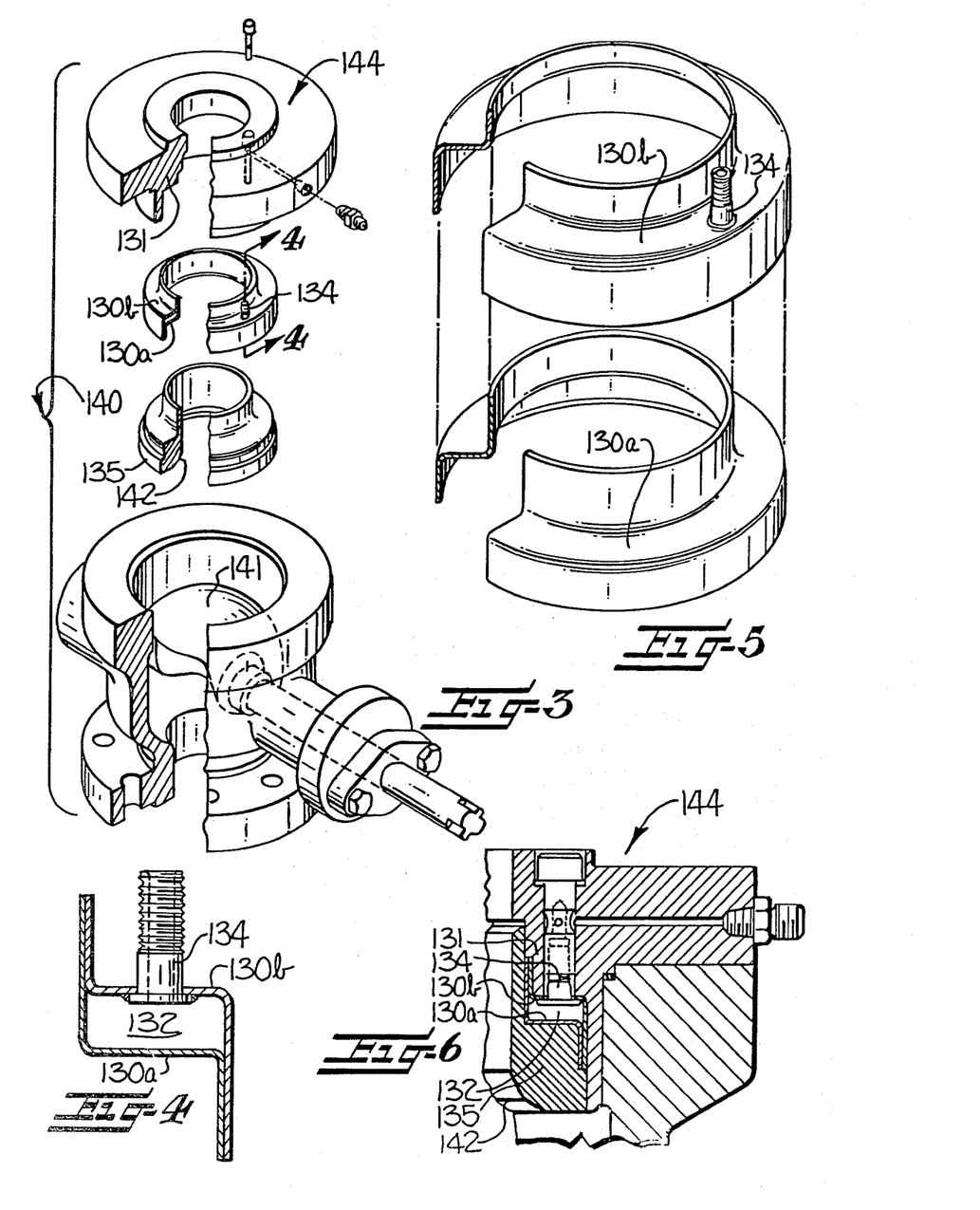
FIG. 3 is an exploded perspective view of certain components of a ball valve incorporating a seal in accordance with FIG. 2.
FIG. 4 is an enlarged sectional view through the seal of FIG. 3, taken generally along the line 4—4 in FIG. 3.
FIG. 5 is an exploded perspective view of the seal of FIG. 4.
FIG. 6 is a section view similar to FIG. 4, through the valve of FIG. 3 as assembled.
Figure 7:
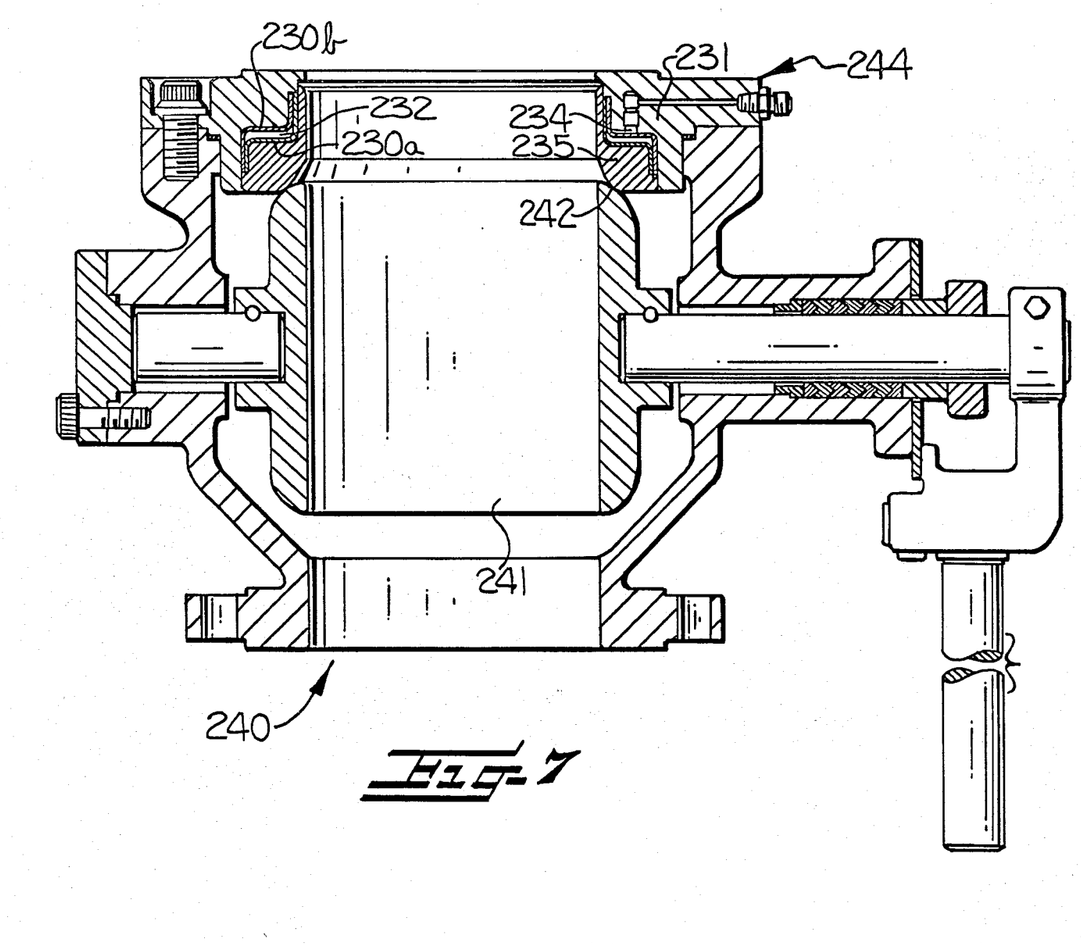
FIG. 7 is a section view through an operating embodiment of a ball valve incorporating the seal of FIG. 2.
Figure 8:
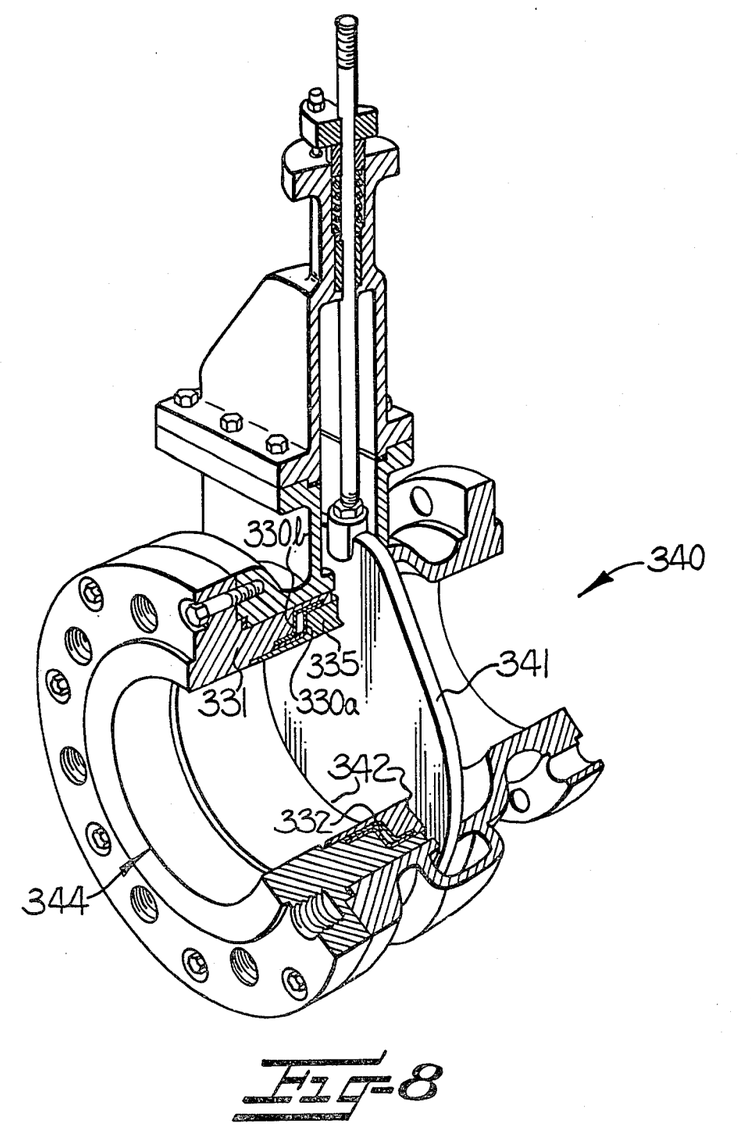
FIG. 8 is a sectional perspective view of a gate valve incorporating the seal of FIG. 2.
Figure 9:
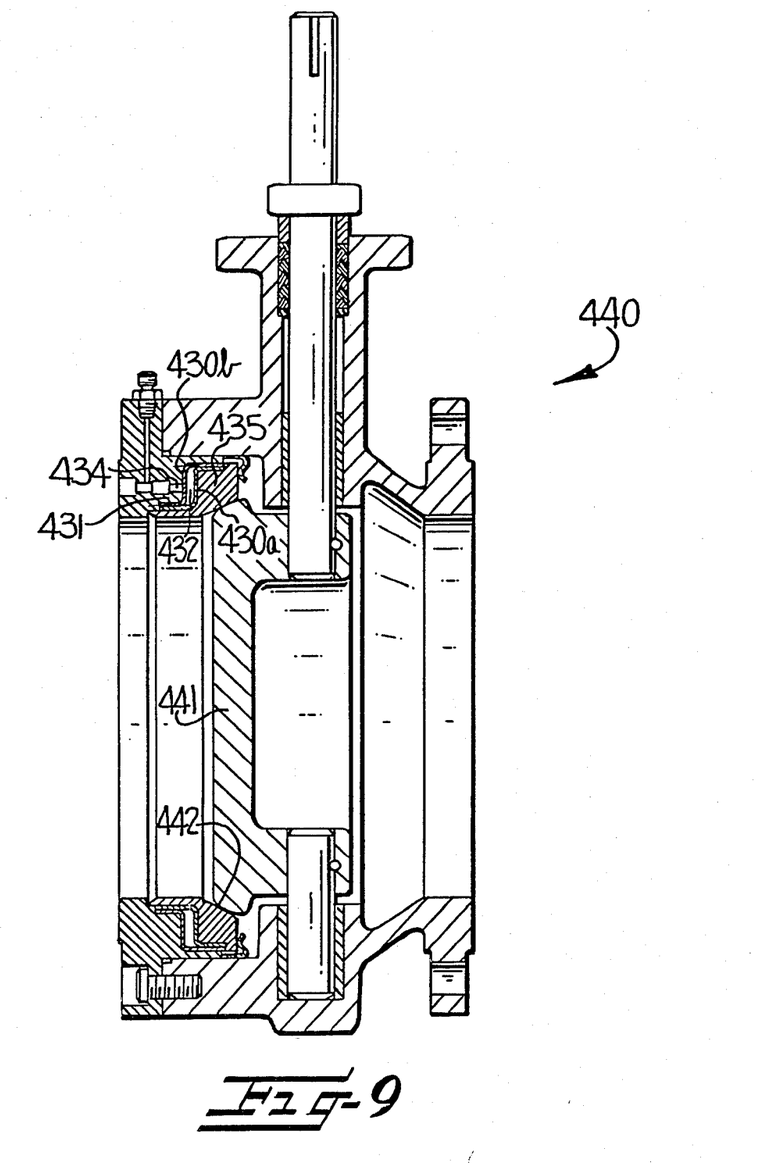
FIG. 9 is a view similar to FIG. 7 showing a butterfly valve.

The device of FIG. 2 is assembled from three component parts: a pressure stem and two thin walled cylinders, each having stepped diameters. The stepped-cylinders are formed such that the transitions from lateral surface to normal surface to lateral surface occur smoothly by means of part-toroidal bends of small radius, R2 and R3. The overall lengths of the inner and outer stepped-cylinders are equal. The device is assembled by inserting the smaller stepped-cylinder into the larger until the ends are flush, and the assembly is then welded at each end to form pressure seals. Assembly of the device of FIG. 1 is similar, with the ends of a single thin walled cylinder being welded to the fixed member. The device of FIG. 1 makes a readily replaceable cartridge type seal.

The inner cylindrical wall of the inner stepped-cylinder is longer than the matching lateral surface of the outer; similarly, the outer cylindrical wall of the outer stepped-cylinder is longer than the matching surface of the inner. The toroidal cavity formed by joining the inner cylinder to the outer is pressurized through a stem inserted through a hole in that surface of the outer cylinder which is perpendicular to the central axis of the device which defines the common axes of the cylinders. The stem is secured in the hole and sealed with a weld.

Where the inner and outer parts of the device both rest against rigid members having surfaces machined to fit exactly their contours and the member fitting the outer cylinder is fixed while the member fitting the inner one is free to move relative to the outer, pressurization of the toroidal cavity by the injection of a fluid under pressure through the pressure stem develops a force in the direction of the cylinder axes. The magnitude of the force is the product of the pressure in the cavity and the projected normal area; and may be approximated as:

$$F = pA = p\pi(R4^2 - R1^2)$$

where
F = the resultant axial force
p = the pressure in the toroidal cavity
A = the projected normal area When this force is great enough that it causes bending in the inner stepped-cylinder in the regions of transition from lateral to normal and normal to lateral surfaces, the member supporting the inner portion of the device will tend to move relative to the other. Under quasi-static conditions and neglecting friction and the force necessary to cold work the thin member, a force equal in magnitude but opposite in direction to the resultant axial force will be necessary to oppose the motion of the member. In this manner, the axial force developed within the pressure cavity can be said to be transferred to and through the movable member. As will be appreciated by persons skilled in the applicable arts, some potential force is absorbed in cold working, and the remainder is transferred.

As relative motion between the two blocks occurs, the bending taking place in the transition regions will be a simultaneous straightening of curved portions of the inner stepped-cylinder and a bending of straight portions to fit the curved surfaces of the movable member. The bending will occur as the pressure in the cavity forces the inner surface of the device to follow the movable member, keeping it in firm contact with it. As the movable member traverses its stroke, the inner lateral surface, having radius R1, will increase in length while the outer lateral surface, having radius R4, will decrease in length. The length of the stroke will be limited by the length of the outer lateral surface of radius R4; the material of the inner cylinder in the vicinity of the end weld should not be strained if pressurization of the cavity is to be assured.

Consistent with general practice in stress analysis, T is kept sufficiently smaller than any of the radii such that all stresses developed by the applied fluid pressure are uniformly distributed across T with insignificant error. It is obvious that if the movable face of the device is unsupported, fluid pressure applied within the device will produce stresses which are unequally distributed from the beginning point of one radiused transition to the ending point of the other, if the radii of the transitions are equal or are chosen randomly. Such uneven distribution of stress results in concentration of stress at particular locations, tending toward failure of the locations of high concentration when pressure advances to a level producing ultimate stress. Such a design undesirably limits wall thickness T consistent with the type of material chosen, such that the useful force available for a given fluid pressure is also limited. In order to prevent excessive stresses from occurring in the thin wall member during movement under pressure, one transitional radius is proportionately larger than the other, as pointed out hereinafter, to equalize material displacement in those areas. Thus by proper calculation, unequal values of transitional radii R2 and R3 may be determined (consistent with the dimensions R1 and R4 dictated by other considerations such as space requirements, any flow conduit size, required force, and acceptable fluid pressure) such that the distribution of stresses within the members is much more uniform, avoiding high concentrations, and permitting a thinner wall thickness T.

In addition, when the movable member or pressure plate is initially fitted onto the device, the matching surfaces are coated with a thin layer of powdered metal alloy consistent with the alloys of the thin wall member, pressure plate, and intended conditions of operation. The assembly may then be installed with the other apparatus with which it is intended to operate, and in consideration of reasonable manufacturing tolerances, some clearance between the thin wall member or members, the pressure plate, and other members of the apparatus against which force is to be exerted will exist. At this point, pressure may be applied within the device, expanding it, and moving the pressure plate against the restraining member of the apparatus. The thin wall member then may not be in uniform contact with the similarly contoured surface of the pressure plate, but if the transitional radii R2 and R3 are chosen as described above with the transitional radius which is further from the central axis of the device being greater, an increase in fluid pressure can bring the stresses in the thin wall to within the yield region, but not beyond the ultimate stress, and the member will then uniformly bear on the contoured surface of the pressure plate, transmitting essentially all fluid pressure developed on the projected interior surface of the device to the desired point of application. It is noted that in this arrangement, the device is then uniformly supported over its entire outside surface, and fluid pressure may then be increased as much as desired, up to the point of failure of the supporting pressure plate, without causing failure of the device. This is a result of the thin wall member or members functioning as a diaphragm or diaphragms transmitting balanced forces arising respectively on the two sides of the thin wall.

Specific applications of the device of this invention are shown in FIGS. 3 through 13, as identified above. In those Figures, comparable reference characters of sequential hundred orders of magnitude are used to identify comparable components. Each of the types of valve structures shown in FIGS. 3 through 9 has a valve body 140, 240, 340, 440 defining a portion of a fluid flow conduit and enclosing a valve member 141, 241, 341, 441 movable to block or pass flow through the conduit. Each valve body defines an elongate fluid containing cavity or flow conduit and encloses a corresponding valve member. Each valve member is mounted for movement (either rotation or translation) relative to an axis extending perpendicular to the conduit. In each instance, a seal means preferably in the form of a seat 142, 242, 342, 442 is interposed between the movable member of the device of the present invention and the valve member and bears against the valve member for assuring that fluid leakage does not occur. In at least certain instances, powdered metal or other cushioning gasket material is inserted between the thin wall member and the movable member for aiding in force distribution and/or adaptation of the seal to manufacturing tolerances as described above. While each valve body shown in these figures has an adapter flange portion 144, 244, 344, 444 which functions as a reaction or fixed member enclosing a device of the general type shown in FIG. 2, it will be appreciated that the adapter flanges may serve as welding attachment points for a single thin wall member device of the general type shown in FIG. 1. In the latter instance, provision may be made in at least some circumstances for introduction of pressurizing fluid through a plurality of passages through the adapter flange in order to assure uniform distribution of such fluid under any operating conditions and accommodate small clearances between the fixed and thin wall members.

Figure 10:
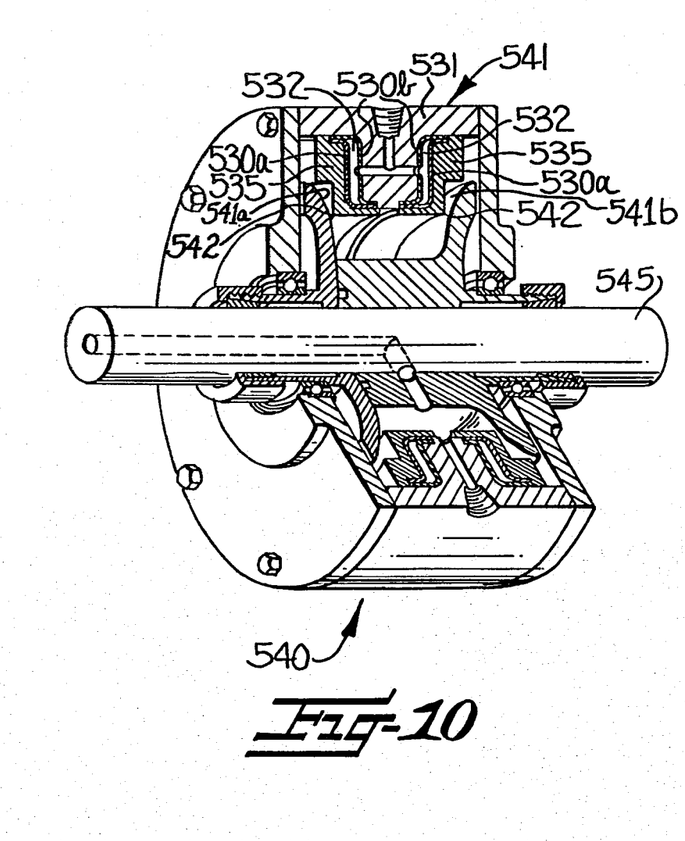
FIGS. 10 and 11 are views similar to FIG. 8 showing rotary connections.
Figure 11:
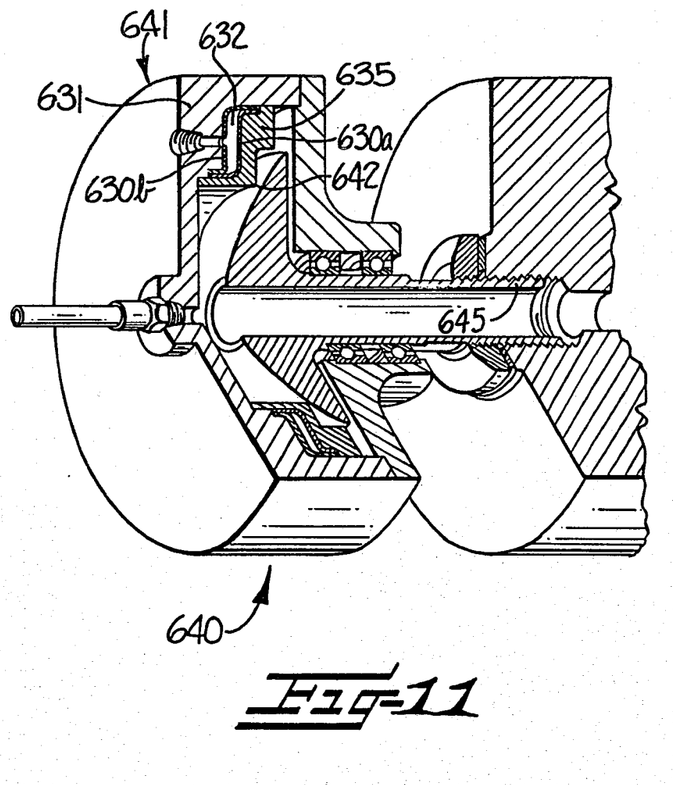

The rotary connections of FIGS. 10 and 11 accomplish communication of fluid between a stationary source or sump and a rotating source or sump, and use one or a pair of seal devices of the type described mounted within a housing 540, 640 and cooperating with part spherical surfaces of one or a pair of rotating members 541a, 541b, 641. The connection of FIG. 10 accomplishes fluid communication at a point intermediate the ends of a shaft or the like, while the connection FIG. 11 is located at an end of a shaft or the like. In each instance, the device of the present invention cooperates with a shaft 545, 645 mounted for rotation about an elongate axis and having the rotating members 541a, 541b, 641 arranged as generally radial load bearing surfaces encircling the shaft axis. Forces imposed by the devices of the present invention assure sealing against fluid leakage.

Seal applications of the expansible device of this invention may also extend to pressure vessel closures such as autoclave doors, manholes and the like where a seal in the form of either of FIGS. 1 and 2 is incorporated into either the vessel or the cooperating closure.

Figure 12:
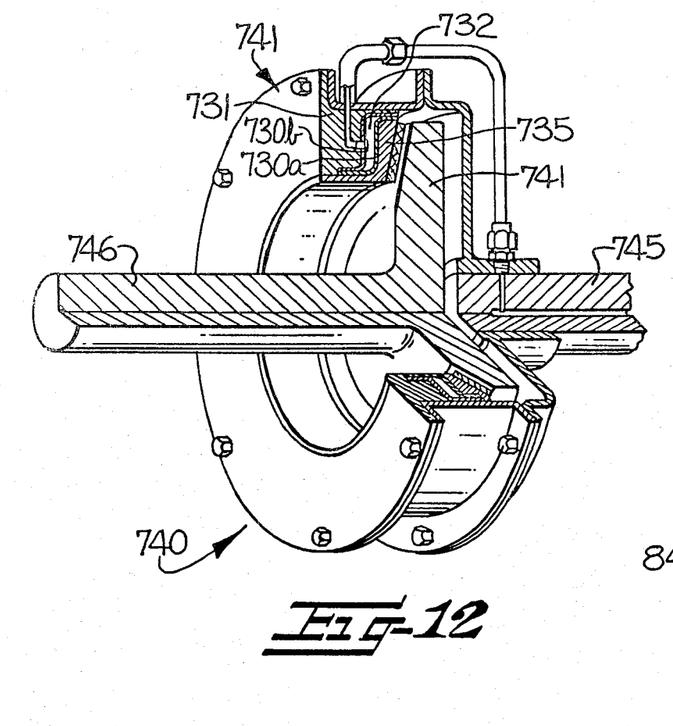
FIG. 12 is a view similar to FIG. 8 showing a clutch.
Figure 13:
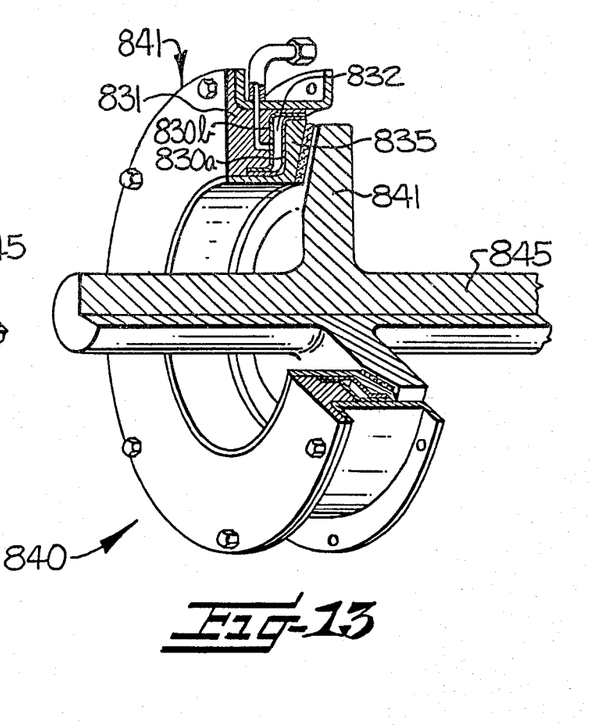
FIG. 13 is a view similar to FIG. 12 showing a brake.

Application of the expansible device of this invention as an actuator in addition to sealing are shown in FIGS. 12 and 13. As there shown, the variable loading force imposed by a device generally of the form of FIG. 2 is applied through a friction face to either couple two rotating elements together (in the clutch of FIG. 12) or slow a rotating element (in the brake of FIG. 13). In the clutch form, the housing 740 rotates with one shaft 745, while a cooperating radial load bearing surface is fixed to a shaft 746 to be coupled or uncoupled. In the brake form, the housing 840 is fixed, and load is imposed on a brake disc 841 fixed to an encircled shaft 845. As will be understood, the actuator uses of the device of this invention may be expanded beyond those shown and may include, for example, fluid pressure amplifiers or multipliers where the movable member operates to transmit force to another fluid chamber or cavity.

In all forms shown and described, the material of the thin wall members is metallic, in order to permit exposure of the devices to virtually any environment without risk of unacceptable injury, damage or failure. Indeed, the particular shape and operation described above are contemplated as particularly facilitating such use of metallic thin wall members for sealing against fluid flow while accommodating transmission of force.

That which is claimed is:

1. A fluid control device, comprising:
    a relatively immovable annular first member;
    a relatively movable annular second member at least partly concentrically located within said first member and spaced from said first member to form a chamber;
    an external fluid pressure source in fluid communication with said chamber;
    an annular sealer disposed in said chamber between said first and second members, fluid-tightly sealing said chamber, said sealer comprising:
        a first section extending substantially parallel to the longitudinal axis of said first member;
        a second section extending substantially parallel to the longitudinal axis of said first member, located at a different radial distance from the longitudinal axis of the first member than said first section and substantially axially spaced from said first section;
        an intermediate section connecting said first and second sections, contoured to the shape of and at all times fully contacting said second member, said first and second sections being attached at their respective ends to said first member to form respective first and second terminal points,
    said sealer exerting pressure upon said movable second member by means of fluid pressure from said pressure source.

2. A fluid control device, comprising:
    a relatively immovable annular first member;
    a relatively movable annular second member at least partly concentrically located within said first member and spaced from said first member to form a chamber;
    an annular sealer located within said chamber, comprising:
        a first annular sealer having first and second sections, said first and second sections being located at different radial distances from the longitudinal axis of said first member;
        a flexible second sealer having a first section attached to the first section of said first sealer at a first terminal point and a second section attached to the second section of said first sealer at a second terminal point, said first sealer being at least partially axially spaced from said second sealer, said second sealer being contoured to the shape of and at all times fully contacting said movable member;
    an external fluid pressure source in fluid communication with the space between said first and second sealers, said second sealer exerting pressure upon said movable second member by means of fluid pressure from said pressure source.

3. A fluid control device, comprising:
    a relatively immovable annular first member;
    a relatively movable annular second member at least partly concentrically located within said first member and axially spaced from said first member to form a chamber;
    an annular chamber sealer located within said chamber, comprising:
        a first annular sealer having first and second sections and first and second ends, contoured to the shape of and contacting said immovable first member, said first and second sections being located at different radial distances from the longitudinal axis of said first member;
        a flexible annular second sealer having a first end attached to the first end of said first sealer at a first terminal point, and a second end attached to the second end of said first sealer at a second terminal point, said first sealer being at least partially axially spaced from said second sealer, said second sealer being contoured to the shape of and at all times fully contacting said movable member;
    an external fluid pressure source in fluid communication with the space between said first and second sealers by means of a connector extending through said first sealer, said second sealer exerting pressure upon said movable second member by means of fluid pressure from said pressure source.

4. A fluid control device comprising:
    a relatively immovable annular first member;
    a relatively movable annular second member at least partly concentrically located within said first member and axially spaced from said first member to form an annular chamber;
    an external fluid pressure source in fluid communication with said chamber;
    an annular flexible sealer disposed in said chamber between said first and second members, fluid-tightly sealing said chamber, said sealer comprising:
        a first section extending substantially parallel to the longitudinal axis of said first member;
        a second section extending substantially parallel to the longitudinal axis of said first member, located at a different radial distance from the longitudinal axis of the first member than said first section and axially spaced from said first section;
        an intermediate section connecting said first and second sections, contoured to the shape of and at all times fully contacting said second member, said first and second sections being attached at their ends to said first member to form first and second terminal points,
    said sealer exerting pressure upon said second member by means of fluid pressure from said pressure source.

5. A fluid control device, comprising:
    a relatively immovable annular first member;
    a relatively movable annular second member at least partly concentrically located within said first member and spaced from said first member to form an annular chamber;
    a chamber sealer located within said chamber, comprising:

a first annular sealer having first and second sections and first and second ends, contoured to the shape of and contacting said immovable first member, said first and second sections being located at different radial distances from the longitudinal axis of said first member;

a flexible annular second sealer having a first end attached to the first end of said first sealer at a first terminal point, and a second end attached to the second end of said first sealer at a second terminal point, said first sealer being at least partially axially spaced from said second sealer, said second sealer being contoured to the shape of and at all times fully contacting said movable second member;

an external fluid pressure source in fluid communication with the space between said first and second sealers by means of a connector extending through said first sealer, said second sealer exerting pressure upon said second member by means of fluid pressure from said pressure source.

6. A fluid control device as claimed in claim 5, wherein said first sealer comprises a first section extending substantially parallel to the longitudinal axis of said first member, a second section extending substantially parallel to the longitudinal axis of said first member and disposed at a shorter radial distance from said axis than said first section, and a first intermediate section connecting said first and second sections; and said second sealer comprises a third section extending substantially parallel to the longitudinal axis of said first member, having a length less than that of said first section, a fourth section extending substantially parallel to the longitudinal axis of said first member and disposed at a shorter radial distance from said axis than said third section, having a length greater than that of said second section, and a second intermediate section connecting said third and fourth sections.

7. A fluid control device as claimed in claim 4, wherein said sealer is a flexible metal sealer.

8. A fluid control device as claimed in claim 6, wherein said first sealer is a flexible metal sealer and said second sealer is a flexible metal sealer.

9. A fluid control device as claimed in claim 4, wherein said first and second sections and said intermediate section are connected by means of smoothly curved portions.

10. A fluid control device as claimed in claim 6, wherein said first and second sections and said first intermediate section are connected by means of smoothly curved portions, and said third and fourth sections and said second intermediate section are connected by means of smoothly curved portions.

11. A fluid control device, comprising:
a relatively immovable annular first member;
a relatively movable annular second member at least partly concentrically located within said first member and axially spaced from said first member to form a chamber;
an external fluid pressure source in fluid communication with said chamber;
an annular flexible sealer disposed in said chamber between said first and second members, fluid-tightly sealing said chamber, said sealer comprising:
a first section;
a second section located at a different radial distance from the longitudinal axis of the first member than said first section;
an intermediate section connecting said first and second sections, contoured to the shape of and at all times fully contacting said second member, said first and second sections being attached to said first member at first and second terminal points;
said sealer exerting pressure upon said movable second member by means of fluid pressure from said pressure source.

12. A fluid control device, comprising:
a relatively immovable annular first member;
a relatively movable annular second member at least partly concentrically located within said first member and axially spaced from said first member to form a chamber;
an external fluid pressure source in fluid communication with said chamber;
an annular flexible metal sealer disposed in said chamber between said first and second members, fluid-tightly sealing said chamber, said sealer comprising:
a first section;
a second section located at a different radial distance from the longitudinal axis of the first member than said first section;
an intermediate section connecting said first and second sections, contoured to the shape of and at all times fully contacting said second member, said first and second sections being attached to said first member at first and second terminal points;
said sealer exerting pressure upon said movable second member by means of fluid pressure from said pressure source.

13. A fluid control device, comprising:
a relatively immovable annular first member;
a relatively movable annular second member at least partly concentrically located within said first member and spaced from said first member to form a chamber;
an annular chamber sealer located within said chamber, comprising:
an annular first sealer having first and second sections and first and second ends, contoured to the shape of and contacting said immovable first member, said first and second sections being located at different radial distances from the longitudinal axis of said first member;
an annular flexible metal second sealer having a first section attached to the first section of said first sealer at a first terminal point, and a second section attached to the second section of said first sealer at a second terminal point said first sealer being at least partially spaced from said second sealer, said second sealer being contoured to the shape of and at all times fully contacting said movable member;
an external fluid pressure source in fluid communication with the space between said first and second sealers by means of a connector extending through said first sealer, said second sealer exerting pressure upon said movable second member by means of fluid pressure from said pressure source.

14. A fluid control device comprising:
a relatively immovable annular first member;

a relatively movable annular second member at least partly concentrically located within said first member and spaced from said first member to form an annular chamber;

an external fluid pressure source in fluid communication with said chamber;

an annular flexible metal sealer disposed in said chamber between said first and second members, fluid-tightly sealing said chamber, said sealer comprising:

a first section extending substantially parallel to the longitudinal axis of said first member;

a second section extending substantially parallel to the longitudinal axis of said first member, located at a different radial distance from the longitudinal axis of the first member than said first section;

an intermediate section connecting said first and second sections, contoured to the shape of and at all times fully contacting said second member, said first and second sections being attached at their ends to said first member, said sealer exerting pressure upon said second member by means of fluid pressure from said pressure source.

15. A fluid control device, comprising:

a relatively immovable annular first member;

a relatively movable annular second member at least partly concentrically located within said first member and axially spaced from said first member to form an annular chamber;

an annular chamber sealer located within said chamber, comprising:

a flexible metal annular first sealer having first and second sections and first and second ends, contoured to the shape of and contacting said immovable first member, said first and second sections being located at different radial distances from the longitudinal axis of said first member;

a flexible metal annular second sealer having a first end attached to the first end of said first sealer at a first terminal point, and a second end attached to the second end of said first sealer at a second terminal point, said first sealer being at least partially spaced from said second sealer, said second sealer being contoured to the shape of and at all times fully contacting said movable second member;

an external fluid pressure source in fluid communication with the space between said first and second sealers by means of a connector extending through said first sealer, said second sealer exerting pressure upon said second member by means of fluid pressure from said pressure source.

16. A fluid control device as claimed in claim 15, wherein said first sealer comprises a first section extending substantially parallel to the longitudinal axis of said first member, a second section extending substantially parallel to the longitudinal axis of said first member and disposed at a shorter radial distance from said axis than said first section, and a first intermediate section connecting said first and second sections; and said second sealer comprises a third section extending substantially parallel to the longitudinal axis of said first member, having a length less than that of said first section, a fourth section extending substantially parallel to the longitudinal axis of said first member and disposed at a shorter radial distance from said axis than said third section, having a length greater than that of said second section, and a second intermediate section connecting said third and fourth sections.

* * * * *